United States Patent [19]

Stonestrom

[11] Patent Number: 4,914,955
[45] Date of Patent: Apr. 10, 1990

[54] SOAPFILM FLOWMETER DEVICE FOR MEASURING GAS FLOW RATES

[75] Inventor: David A. Stonestrom, Palo Alto, Calif.

[73] Assignee: The United States of America as represented by the Secretary of the Interior, Washington, D.C.

[21] Appl. No.: 258,955

[22] Filed: Aug. 29, 1988

[51] Int. Cl.[4] ............................................. G01F 1/708
[52] U.S. Cl. .................................................. 73/861.05
[58] Field of Search ....................................... 73/861.05

[56] References Cited

U.S. PATENT DOCUMENTS

| | | | |
|---|---|---|---|
| 3,248,941 | 5/1966 | McArthur | 73/861.05 |
| 3,277,707 | 10/1966 | Rodel | 73/861.05 |
| 3,748,902 | 7/1973 | Guild | 73/861.05 |
| 4,762,004 | 8/1988 | Lalin et al. | 73/861.05 |

OTHER PUBLICATIONS

Gooderham "Soap Film Calibrators in Journal of The Society of Chemistry".

Primary Examiner—Herbert Goldstein
Attorney, Agent, or Firm—E. Philip Koltos

[57] ABSTRACT

A device for measuring rates of gases over a wide range of absolute pressures is provided which comprises a soapfilm generating chamber having a magnetically actuated, slidable cup which is used to form a soapfilm at the lower end of a flow metering tube, a flow metering tube having photoelectric or other flow measuring means, and a soapfilm trap with puncturing means which punctures the soapfilm after it has been made to travel the length of the flow metering tube by the flow of gas to be measured. The device of the present invention provides a simple, inexpensive means for measuring gas flow rates over a wide range of gas pressures, and the device can be used conveniently and accurately in taking measurements in a variety of different applications.

5 Claims, 1 Drawing Sheet

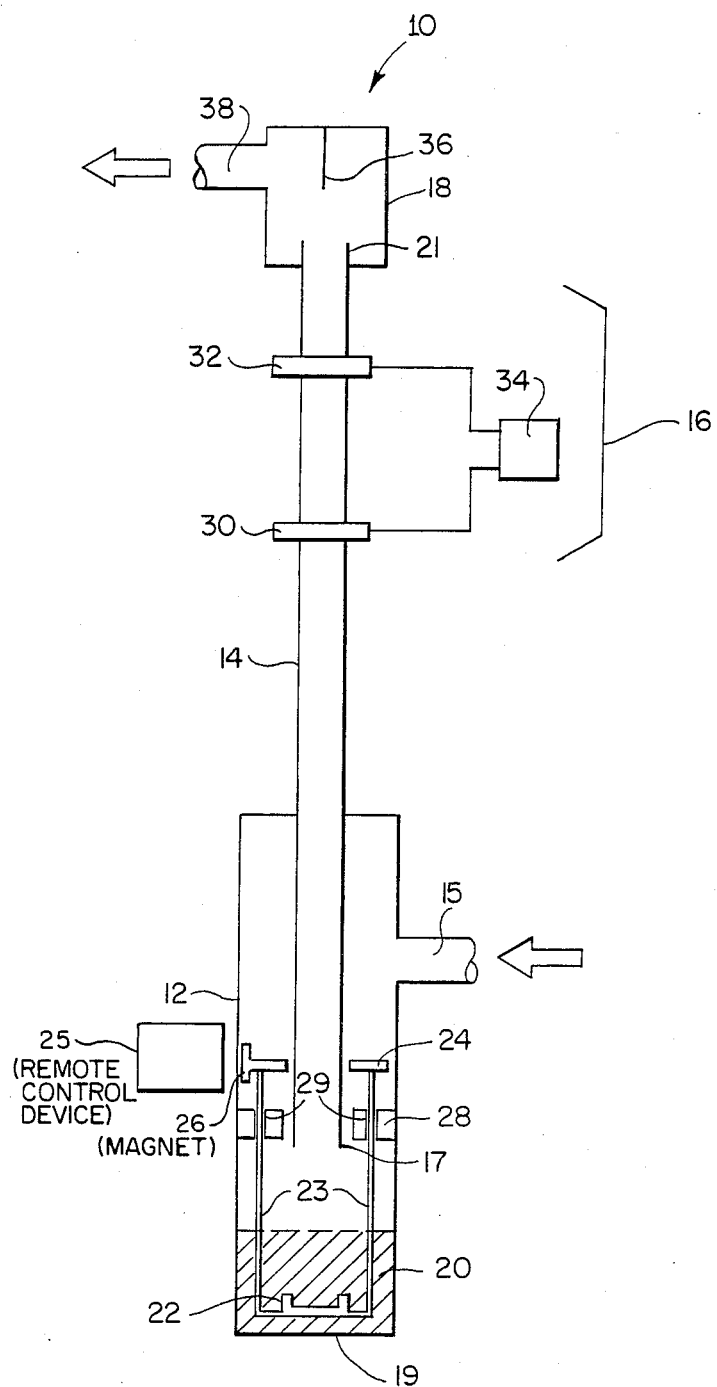

SOAPFILM FLOWMETER DEVICE FOR MEASURING GAS FLOW RATES

FIELD OF THE INVENTION:

The invention relates in general to an apparatus for measuring gas flow rates and in particular to a soapfilm flowmeter device for measuring gas flow rates over a wide range of absolute pressures.

BACKGROUND OF THE INVENTION:

Quick and accurate on-line measurements of gas flow rates at various pressure levels are required in a great variety of scientific, engineering and industrial fields for a large number of different purposes. For instance, in geological investigations, measuring the permeability of natural-gasbearing rocks is a key in assessing their value and importance. In a variety of other investigative and regulatory activities, gas flow measurements are needed to determine such parameters as air permeability of soils, gas permeabilities of potential waste repositories, radon-transmission properties of soils and rocks, and gas permeability of porous media at distinct levels of absolute gas pressures such as would be required in the petroleum industry. Still further uses of accurate gas flow devices include calibration of other, less accurate flowmeters, such as rotameters, and other types of indirect gas flow devices including thermal anemometers and turbine-type transducers. The usefulness of accurate gas flow devices, particularly those which can be employed over a wide range of gas pressures, cannot be understated.

It has been known in the prior art to use a wide variety of devices in order to perform the task of measuring gas flow rates for a number of different situations. Common devices used in gas flow measurements include the Stokes-law based float-type flowmeters, such as described in Gilmont et al, *Instruments and Control Systems, Vol.* 34, p. 2070 (1961), turbine-type flow transducers, as described in Dowdell, *Flow: Its Measurement and Control in Science and Industry, Vol.* 1, *Part* 2, page 687 (1974), thermal flow transducers, also described by Dowdell at page 549, and gasometers (see, e.g., Black et al, *Methods of Soil Analysis, Part I*, pp. 321-322, 1965). The float, turbine, and thermal devices measure momentum or thermal properties of the flow rather than directly measuring the flow rate. The accuracy of such indirect measuring devices is thus quite limited. With regard to gasometers, these devices cannot be used in on-line applications since they are "dead-end" devices. Measurements of true, steady-state gas flow cannot thus be obtained using these devices.

It has also been known in the past to use soapfilm devices to assess gas flow. The conventional soapfilm flowmeter (see, e.g., *Kontes Scientific Glassware/Instruments General Catalog TG*-60, p. 207, 1982) measures volume displacement with time and employs a flexible bladder as a soap solution reservoir. These devices are disadvantageous in that limits to low absolute values of gas pressure are imposed by the flexible bladder. Also known are reversing soapfilm flowmeters, such as described in Estes et al, *Trans. AIME, Vol.* 207, p. 338 (1956). These reversing soapfilm devices suffer from various drawbacks such as difficult soapfilm generation, manual timing functions subject to large operator error, and the need for periodic interruption and reversal of flow to keep the soapfilm in the device.

Soapfilm flow measuring devices are also known in the patent art. For example, U.S. Pat. No. 3,248,941 (McArthur) discloses a soapfilm flowmeter wherein a perforated movable bucket is employed in the formation of soapfilms. The mechanism that is employed for moving the bucket requires a mechanically sealed, rotatable shaft that passes through the body of the flowmeter, thus providing a potentially accuracy-degrading leakage path. In addition, this device is only applicable for low gas pressures, and a second embodiment is necessary for measurement of high pressure gases. Another device is disclosed in U.S. Pat. No. 4,691,577 (Lalin et al.) which employs soapfilms in gas measurements, but this complex flowmeter requires either an apertured or open-flared bottom tube as the flow-measuring channel. In addition, this device employs a flexible membrane that must be sealed against a movable object and a stationary object, and the seal thus provides a potential leakage path. Still other fluid flow devices are disclosed in U.S. Pat. No. 3,277,707 (Rodel), which requires an electrically conductive liquid film in addition to a mechanical pressure seal against a movable object, and No. 3,748,902 (Guild) in which the gas flow tube has sections having a variety of different diameters.

What is desired, therefore, and what has not yet been obtained in the prior art, is the development of a simple soapfilm flow meter device which employs a simple cylindrical non-apertured flow measurement tube and photoelectric or other accurate measuring means, which avoids the use of mechanical pressure seals against movable parts, and which can be used to obtain gas flow rates accurately, conveniently, and effectively over a wide range of gas pressures and a variety of different circumstances.

SUMMARY OF THE INVENTION:

According to the present invention, a device for measuring flow rates of gases at various absolute pressures is provided which comprises a soapfilm generating chamber having gas inlet means, soap solution reservoir and a slidable cup which retains soap solution and which can be maneuvered via coupled magnetic fields so as to form a soapfilm at the inner end of a flow metering tube; a flow metering tube, having flow measurement means, positioned in the soapfilm generating chamber so that a soapfilm can be formed at its inner end which is carried through the tube past the flow measurement means by a flow of gas entering the chamber via the gas inlet means; and a soapfilm trap capable of retaining the outer end of the flow metering tube having gas outlet means and a puncturing means for puncturing the soapfilm after it has passed through the flow measurement means. This device avoids the use of mechanical pressure seals against any movable part and is simple, inexpensive, and can be conveniently and accurately used to measure flow rates of gases at a variety of different pressures and under a variety of different circumstances.

BRIEF DESCRIPTION OF THE DRAWING FIGURE

The drawing figure is a schematic view of the device of the present invention.

DETAILED DESCRIPTION OF THE PREFERRED EMBODIMENT

A device 10 according to the present invention can be observed schematically in the drawing figure. The device 10 is primarily comprised of soapfilm generating chamber 12, flow metering tube 14, having photoelectric flow measuring means indicated at 16, and soapfilm trap 18. The soapfilm generating chamber 12 has gas inlet means such as tube 15 whereby the gas to be measured can enter the device. Chamber 12 is positioned so as to be able to retain the inner end 17 of flow metering tube 14 so that gas will flow into chamber 12 via inlet means 15, and then into tube 14 via its inner end 17. The chamber 12 is constructed of a rigid, non-porous material, such as plastic, glass, or non-ferrous metal, so that at its bottom end 19, it provides a reservoir for soap solution 20. The chamber also contains a slidable non-porous cup 22 which can be maneuvered into soap solution reservoir 20 so as to become filled with the soap solution. The cup 22 can then be maneuvered upwards so that a soapfilm (not shown) can be formed at inner end 17 of flow metering tube 14, as will be discussed below.

In the preferred embodiment, the slidable cup 22 is manipulated towards the flow metering tube by means of a pair of connection rods 23 connected to an upper supporting ring 24. The upper supporting ring 24 has the shape of a torus and is dimensioned to move freely in the annular space between the lower portion of flow metering tube 14 and the wall of soapfilm generating chamber 12. Ideally, a magnet 26 is attached to the perimeter of the upper supporting ring 24. Further, a stationary guide ring 28 situated between the cup 22 and the upper ring 24 is provided having holes 29 through which the connecting rods 23 can pass. This guide ring 28 is located a short distance above the inner end 17 of flow-metering tube 14 so that the slidable cup 22 is guided to the inner end 17 of tube 14 when an exterior magnet or other remote control means on the outside of device 10 is coupled to the inner magnet 26 and raised upwards. The system of magnets used in the invention allows remote manipulation of slidable cup 22 without creating any additional passageways into the soapfilm generating chamber 12 and without the need to form a pressure seal against a movable part. Momentary contact of soap solution retained in cup 22 with the opening at the inner end 17 of tube 14 creates a soapfilm that then blocks the opening of tube 14. When gas is then directed into chamber 12 by inlet means 15, the gas flow entrains the soapfilm, and directs it upwards through flow metering tube 14 so that it will pass flow measuring means 16. The entrained soapfilm will pass upwards in tube 14 for a sufficient length before arriving at measuring means 16 so that the flow rate will stabilize following the slight disturbance caused by creation of the soapfilm.

The flow metering tube is preferably cylindrical, and is made from a rigid, transparent, hydrophilic material impervious to gases, such as glass or other transparent plastics. In the preferred embodiment, the flow measuring means 16 of flow metering tube 14 is a photoelectric system comprised of a first or lower lamp-phototransistor trigger 30, a second or upper lamp-phototransistor trigger 32, and a timing means 34. The soapfilm passing upwards through tube 14 will first pass the lower lamp-phototransistor trigger 30, which photoelectrically starts the timing means 34, preferably an electronic timer. When the soapfilm passes the upper lamp-phototransistor 32, the electronic timer 34 is signalled to stop, thus allowing a measure of elapsed time for the flow of the soapfilm from lamp 30 to lamp 32. This recorded amount of time is then used to determine the flow rate of the gas which has forced the soapfilm through tube 14, and this determination of flow rate is discussed further below. The present invention can also employ a number of suitable flow measuring means other than photoelectric timing means, such as the spaced metallic electrodes which are used to time the passage of the soapfilm in the measuring tube disclosed in U.S. Pat. No. 3,248,941 (McArthur). Electrodes, such as those used in the McArthur patent, can be used to transmit a signal to start and stop the timing means based on the conductivity or dielectric constant of the soapfilm as it passes the electrodes.

The device 10 also comprises a soapfilm trap 18 which is situated at the upper end 21 of flow metering tube 14, and which receives the soapfilm after it has passed through the photoelectric or other measuring means 16 of the tube 14. The trap 18 has a puncturing means such as needle 36 which punctures the incoming soapfilm and effects its removal from the flowing gas before the gas exits the device. The trap 18 contains gas outlet means such as tube 38, so that when the flow metering tube 14 is positioned in the trap 18, the gas flows out from upper end 21 into the trap and exits through the gas outlet means 38. The device 10 thus provides a directed path for an incoming flow of gas, which is directed through inlet means 15 into chamber 12, through flow-metering tube 14 into trap 18, and comes out via outlet means 38. While traversing the device, the flow of gas is caused to direct a soapfilm formed at the inner end 17 of metering tube 14 through the photoelectric means 16 so that the flow rate of the gas can be measured. The gas flow measuring device of the present invention can be used conveniently and effectively in measuring flow rates of gases at varying absolute pressures and under a variety of different circumstances.

To set up the gas flow measuring device of the present invention, a soap solution 20 is placed at the low end 19 of the soapfilm generating chamber 12. If the inner surface of flow-metering tube 14 is dry, the tube 14 must be first wetted with a thin film of soap solution before measurements of gas flow rates can be taken. To effect wetting, cup 22 is filled with soap solution 20 by lowering it to the bottom of chamber 12. The cup 22 is then maneuvered upwards by means of an exterior magnet (not shown) and interior magnet 26 so that it is held next to the inner end 17 of flow-metering tube 14 while gas is allowed to flow in through inlet means 15 into the chamber 12. The gas will then flow through tube 14, and this action generates a steady stream of soapfilms entering the bottom or inner end 17 of flow metering tube 14. Once the tube 14 is in wetted condition, a momentary contact of slidable cup 22 containing soap solution and the inner end 17 of tube 14 will be sufficient to generate one or more soapfilms which are directed to travel the length of the flow-metering tube.

The device of the present invention can be calibrated in any conventional manner known, but the preferred manner of calibration will be described herein. Generally, the calibration will be directed towards a determination of volume (or $\Delta V$) corresponding to the timed interval (or $\Delta t$) for gas to flow from start trigger 30 to stop trigger 32. In the preferred calibration, a single soapfilm is stopped in the wetted flow metering tube 14 just above the upper lamp-phototransistor 32 by closing a valve (not shown) placed downstream of the outlet tube 38. The gas inlet means 15 is then connected to the top of a burette filled with a non-volatile liquid of known density (p). The volume of this liquid must exceed the volume of the flow-metering tube in the timed selection. The gas outlet means 38 is opened to the surrounding atmosphere and the burette's stopcock is slightly opened until the soapfilm, moving down the flow-metering tube as liquid leaves the burette, becomes positioned exactly at the trigger point of upper phototransistor 32. At this point, the burette's stopcock is closed and a tared weighing vessel is positioned to collect liquid flowing from the burette. The stopcock is again opened, regulating the flow of liquid until the soapfilm moves exactly to the trigger point of the lower lamp or phototransistor 30. At this point, the stopcock is closed, and the total mass (M) of the liquid collected is determined by weighing. The total volume ($\Delta V$) of the region corresponding to the timed interval is then determined by the equation $\Delta V = M/p$.

Whenever the pressure of the flowing gas to be measured is increased or decreased significantly from a previously maintained value, a definite quantity of gas will dissolve into (or exsolve out of) the soap solution, creating a potential source of errors when very small flow rates are measured. In such cases, sufficient time must elapse after changing the gas pressure to allow this intake (or release) to occur. To test the rate of uptake (or release) at the current level of pressure, a soapfilm can be stopped in the flow-metering tube 14 by closing a valve either upstream or downstream of the device and monitoring the position of the soapfilm in the flow-metering tube 14 while applying the current pressure level to the open end of the device. Motion of the soapfilm will cease when equilibrium is established. It should also be noted however, that the device cannot be used on-line during this test.

The device of the present invention will thus allow direct, on-line measurement of volumetric gas flow rates conveniently, accurately, and over a wide range of absolute gas pressures. The range of absolute gas pressures successfully gauged by an actual device that was built according to this invention was from approximately 20 kPa to about 100 kPa. However, this pressure range does not represent the actual limits of the flow-measuring device of the invention, but is merely provided as an example of what has been achieved in practice. The theoretical lower limit of the device is determined by the vapor pressure of the soap solution, commonly about 3 kPa (at 20° C.). The theoretical upper limit has not been evaluated. The device of the present invention will thus be capable of measuring the flow rates of gases at pressures equal to or greater than about 3 kPa. The device is simple, inexpensive, easy to use, and can be employed to accurately measure gas flow rates in a wide variety of different circumstances for a great number of different purposes.

What is claimed is:

1. A device for measuring flow rates of gases over a range of absolute pressures comprising:
    a soapfilm generating chamber having gas inlet means for directing a flow of gas into said chamber, the lower end of said chamber providing a reservoir for soap solution;
    a flow-metering tube positioned with its lower end in said soapfilm generating chamber so that a soapfilm capable of traveling the length of said tube can be formed at the lower end of the tube, said tube having flow measuring means so that the rate of flow of the gas directed through the tube can be measured by measuring the rate of flow of said soapfilm traveling through said tube;
    a cup positioned inside of said soapfilm generating chamber movable from a first position wherein said cup is immersed in the soap solution reservoir so that the cup is filled with soap solution to a second position wherein the soap solution in the cup is brought into contact with the lower end of said flow-metering tube so that a soapfilm capable of traveling the length of the tube is made to form at the lower end of said tube, the movement of said cup being controlled by a remote control means exterior to said soapfilm generating chamber which controls the movement of the cup without creating any additional passageways into the soapfilm generating chamber; and
    a soapfilm trap positioned at the upper end of said flow-metering tube having gas outlet means for allowing escape of the flow of gas exiting from said tube and puncturing means for puncturing the soapfilm after it has passed through said flow measuring means.

2. A device according to claim 1 wherein the remote control means is magnetic.

3. A device according to claim 2 wherein the cup has a magnet attached to it, and wherein the remote control means comprises a second magnet positioned exteriorly of said soapfilm generating chamber.

4. A device according to claim 1 wherein the flow measuring means are photoelectric.

5. A device according to claim 1 which is capable of measuring the flow rates of gases at absolute pressures equal to or greater than about 3kPa.

* * * * *